Aug. 14, 1934.  C. L. PUTNEY  1,969,990
AUTOMATIC DRIVING MECHANISM
Filed Dec. 31, 1928
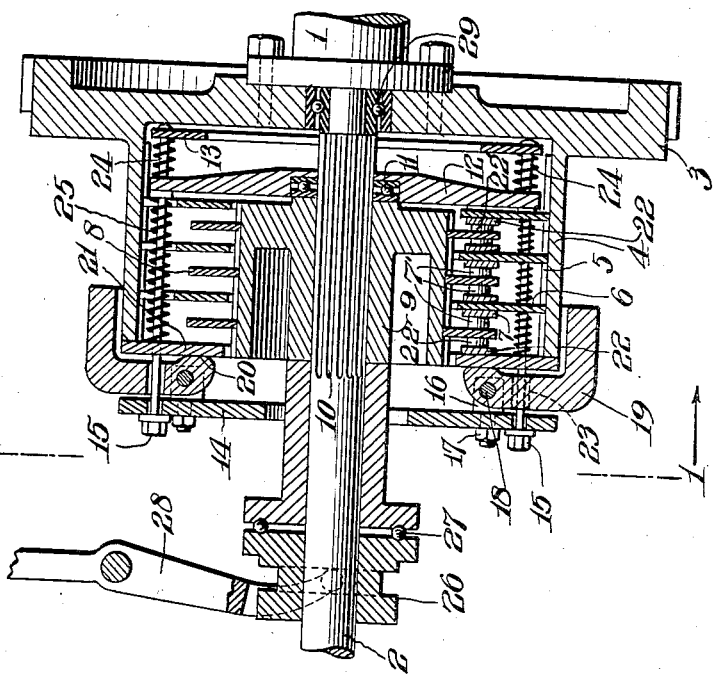
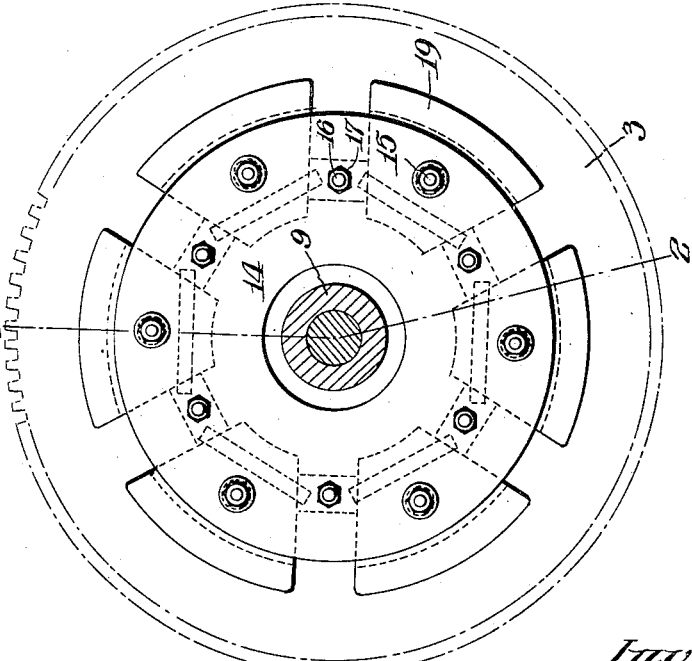
Inventor
Charles L. Putney,
By
Herbert S. Fairbanks
Attorney.

Patented Aug. 14, 1934

1,969,990

UNITED STATES PATENT OFFICE 1,969,990

AUTOMATIC DRIVING MECHANISM

Charles L. Putney, Philadelphia, Pa., assignor to Benjamin F. Argile, Ardsley, Pa.

Application December 31, 1928, Serial No. 329,416

3 Claims. (Cl. 192—105)

The object of this invention is to devise a novel construction and arrangement of an automatic driving mechanism in which driving and driven frictional elements are automatically controlled by centrifugally acting members to automatically vary the power and speed relationship between the driving and driven members.

A further object of my invention is to devise novel means for declutching which is so constructed and arranged that the operator at will, and at any speed, can effect the declutching operation and thereby the relation of the driving and driven frictional elements.

With the above and other objects in view as will hereinafter more clearly appear, my invention comprehends a novel construction and arrangement of an automatic driving mechanism wherein the frictional engagement between the driving and driven frictional elements is automatically controlled by centrifugally acting members to automatically vary the power and speed relationship between the driving and the driven shafts.

It further comprehends a novel automatic driving mechanism wherein a releasing member is provided having resilient means acting against opposite sides of such releasing member.

It further comprehends a novel construction and arrangement of an automatic driving mechanism adapted to be mounted within the flange of the fly wheel and provided with pressure resisting plates on one of which the centrifugally acting levers are movably mounted and between these plates is provided a releasing member which is held in its normal or neutral position by means of opposed springs. The friction elements are in the form of discs provided with carbon graphite plugs in order to increase the durability of the discs and to provide friction discs which will be self lubricating.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is however, to be understood that this embodiment is typical only and that the various instrumentalities of which my invention consists can be variously arranged and organized, and the invention is not limited to the precise arrangement and organization of these instrumentalities as herein set forth.

Figure 1 is a section on line 1—1 of Figure 2 of an automatic driving mechanism embodying my invention.

Figure 2 is a section on line 2—2 of Figure 1.

Similar numerals of reference indicate corresponding parts.

Referring to the drawing:—

1 designates the driving shaft and 2 the driven shaft which is connected by means of a centrifugally controlled clutch which, at the will of the operator, can be declutched.

The driving shaft 1 has secured to it in any desired or conventional manner the fly wheel 3 which is provided with a longitudinally extending flange 4 having its inner periphery provided with the grooves 5 to receive and guide the driving friction elements 6 which are in the form of discs having secured to them the rings 7 which carry the self lubricating heat resisting members 7', the intermediate driving discs having these members on opposite faces in the form of carbon graphite friction members while the end driving discs are each provided with only one of these rings and carbon graphite friction members.

The driven friction elements are in the form of discs 8 which are keyed to the hub of a clutch sleeve 9 which latter is keyed at 10 to the driven shaft 2 and capable of axial movement. The clutch sleeve has its forward end abutting against a thrust bearing 11 which, as illustrated, is seated in a releasing and clamping member 12 in the form of a disc.

13 designates an inner pressure transmitting member and 14 designates an outer pressure transmitting member, and these members are connected by means of the bolts 15 which limit the maximum distance between these members.

The member 14 has connected with it the retaining studs 16 by means of the nuts 17 which engage the threaded shanks of the studs. These studs 16 have pivoted to them at 18 the centrifugally acting levers 19 which are in the form of segments, and, as illustrated, six of these levers 19 are employed. These levers 19 terminate in a laterally extending portion which overhangs the flange 4 and they are provided on the opposite side of their fulcrums with the flat contact faces 20 which contact with the thrust resisting member 21, which has carbon graphite contact portions 22' each secured to its respective member 22, these members 22 being secured to the thrust resisting member 21.

The centrifugally acting levers 19 are recessed as at 23 in order to permit the bolts 15 to freely pass through them without interfering with their movement under centrifugal action.

24 designates releasing springs interposed between the pressure transmitting member 13 and the releasing and clamping member 12, and 25 designates declutching springs which are interposed between the releasing and clamping member 12 and the thrust resisting member 21.

26 designates a clutch collar between which and the clutch sleeve 9 is interposed an antifriction bearing 27.

28 designates a clutch pedal controllable at the will of the operator to actuate the clutch sleeve 9 to mechanically effect the declutching action.

The fly wheel 3 is provided with an anti-friction bearing 29 to receive the reduced end of the driven shaft 2.

The operation of my novel automatic driving mechanism will now be apparent to those skilled in this art and is as follows:—

The friction driving elements are arranged in sets, and, assuming that the driving shaft 1 is in operation, the fly wheel 3, and thereby the driving discs 6 will be revolved. The friction discs are cut out at their outer periphery to form a clearance to receive the bolts 15. When the centrifugally controlled levers 19 are in their normal position there is not a driving frictional engagement between the friction discs but as the speed of the driving shaft 1 increases and reaches a predetermined standard of speed the outward movement of the levers 19, due to the centrifugal action, will cause their inner ends to react on the thrust resisting member 21. This causes the outward movement of the pressure transmitting member 14 and brings the discs into locked frictional engagement with each other so that the driven shaft 2 revolves in unison with the driving shaft 1. It will be seen that as the levers 19 move outwardly they bear against the thrust resisting disc 21 so that the outer pressure transmitting member 14 is moved outwardly thereby drawing with it the pressure transmitting member 13, which, through the medium of the releasing springs 24 causes the releasing and clamping member 12 to be moved outwardly and the discs are in clutched relationship.

If the speed decreases then the centrifugally controlled levers 19 move into a position to release the frictional engagement of the friction discs with each other.

Irrespective of the speed, the operator, can, at will, effect the declutching operation by pressing on the foot treadle in a direction to cause the inward movement of the clutch sleeve 9 thereby moving inwardly the clutch releasing and clamping disc 12 against the action of the releasing springs 24 and permitting the declutching of the friction discs. As soon as the operator releases the foot treadle 28 it will be apparent that the releasing springs 24 will cause the releasing and clamping member 12 to be moved into its normal or neutral position.

The thrust resisting disc 21 is stationary and does not move and the centrifugally controlled weights bear against this disc in order to control the outward movement of the outer pressure transmitting member 14 to effect the clutching of the friction discs and also the inward movement of such discs to effect the declutching movement of the friction discs.

It is not necessary in all cases to employ the declutching springs 25 but in some cases it has been found desirable to use them. The centrifugally controlled weights are carried by the pressure transmitting member 14.

In devices of this character as heretofore constructed it has been found impossible to effect the declutching at high speeds. This declutching action can be effected in applicant's construction at any desired speed due to the provision of the releasing springs 24 which form a resilient means to position the member 12 which forms an abutment.

It will now be apparent that I have devised a new and useful automatic driving mechanism which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In an automatic driving mechanism, a driving member, a driven member, and an automatic clutch forming an operative connection between said members and comprising driving and driven friction discs, a releasing and clamping member for said friction discs, a pressure transmitting member, releasing springs between said pressure transmitting member and said releasing and clamping member, declutching springs acting against said releasing and clamping member and centrifugally acting members operatively connected with said pressure transmitting member to move it towards said releasing and clamping member to effect driving engagement of said friction discs.

2. In an automatic driving mechanism, a driving member, a driven member, and an automatic clutch forming an operative connection between said members, a releasing and clamping member for said friction discs, a pressure transmitting member, releasing springs between said releasing and clamping member and said pressure transmitting member, declutching springs acting against said releasing and clamping member, and means under the control of the operator to move said releasing and clamping member into declutched position.

3. In an automatic driving mechanism, a driving member, a driven member, and an automatic clutch forming an operative connection between said members and comprising driving and driven friction discs, an inner pressure transmitting member, an outer pressure transmitting member, a thrust resisting member, a releasing and clamping member for said friction discs, declutching springs between said releasing and clamping member and said thrust resisting member, releasing springs between said releasing and clamping member and said inner pressure transmitting member, bolts connected with said inner pressure transmitting member, passing freely through said outer pressure transmitting member and headed at their outer ends, and centrifugally acting levers between said thrust resisting member and said outer pressure transmitting member.

CHARLES L. PUTNEY.